United States Patent [19]

Valbonesi

[11] Patent Number: 4,457,687
[45] Date of Patent: Jul. 3, 1984

[54] MOULD FOR THE MANUFACTURE OF SEMI-ELBOWS OF THERMALLY INSULATING MATERIAL FOR PIPES

[75] Inventor: Francesco Valbonesi, Milan, Italy
[73] Assignee: Isoring S.r.l., Milan, Italy
[21] Appl. No.: 483,731
[22] Filed: Apr. 11, 1983
[51] Int. Cl.³ .............................................. B29C 17/00
[52] U.S. Cl. ..................... 425/394; 425/404; 425/188; 249/170; 249/142
[58] Field of Search ............... 425/404, 405 R, 383, 425/384, 392, 393, 394, 84, 85, 188; 249/83, 84, 85, 86, 87, 88, 89, 90, 91, 142, 144, 170, 171, 172

[56] References Cited

U.S. PATENT DOCUMENTS 2,888,783 6/1959 Turnbull .............................. 249/87
3,128,503 4/1964 Hahn et al. ......................... 425/394
3,162,895 12/1964 Pusch .................................. 425/394
3,338,999 8/1967 Knopp ............................. 425/405 X
3,562,860 2/1971 Rottner et al. ..................... 425/384
4,030,866 6/1977 Modej ............................. 249/83 X Primary Examiner—J. Howard Flint, Jr.
Attorney, Agent, or Firm—Joseph W. Molasky & Assocs.

[57] ABSTRACT

A mould for the manufacture of thermally insulating semi-elbows for pipes comprises mating male and female mould parts definng therebetween an annular mould chamber extending for 360° about a central axis, the mould parts being provided with holes or apertures for blowing overheated air into the mould chamber to produce a moulded shaped product from a mixture of mineral fibres and a polymerizable resin when placed in the mould chamber.

3 Claims, 4 Drawing Figures

MOULD FOR THE MANUFACTURE OF SEMI-ELBOWS OF THERMALLY INSULATING MATERIAL FOR PIPES

FIELD OF THE INVENTION

This invention relates to improvements of moulds for manufacturing semi-elbows of thermally insulating material for pipes.

The term "semi-elbow" is used herein to denote substantially one-half the hollow annular member of thermally insulating member required to surround a pipe for insulation purposes and may be considered generally to subtend an angle of 90° to the axis of the annular member so that when two semi-elbows are disposed in face to face abutting relationship they form the member and completely surround the pipe to be thermally insulated.

DESCRIPTION OF THE PRIOR ART

Known methods for thermally insulating pipe elbows require a high degree of skill and labour and are generally not satisfactory and of poor quality.

It is known in the moulding art to produce a moulded product by compacting in a mould a mixture mineral fibres and a polymerisable resin and to polymerise the resin by exposing it to overheated air.

SUMMARY OF THE INVENTION

The present invention provides a mould for the manufacture of a thermally insulating semi-elbows for pipes, the semi-elbows being formed from mineral fibres bonded by a polymerisable resin characterized in that it consists of a upper support plate carrying the male mould parts and a lower support plate carrying the female mould parts, the upper and lower plate being hinged to one another, the female mould parts, presenting a peripheral flanged portion and an annular abutment portion extending upwardly from said peripheral flanged portion, the male mould parts presenting an L-profiled flanged portion mating with said annular abument portion and fixed to the outside surface of the upper plate the latter abutting against said annular abutment portion of the female mould parts, said peripheral flange of the female mould portion and the L-profiled flange of the male mould portion being operable to center, respectively, the male portion in the upper support plate and the female portion in the lower support plate, the male and female mould defining therebetween a mould chamber extending for 360° about a central axis, the mould parts being provided with holes or apertures for blowing overheated air into the mould chamber to produce a moulded shaped product from the mixture of mineral fibres and a polymerisable resin when placed in the mould chamber.

The mould chamber may be configured to have two axes of symmetry to provide four rectilinear portions joined by curvilinear or radiused portions so that when the moulded product is severed along angularly displaced planes extending from the central axis, the planes may be selected such that the moulded product between these planes includes a curvilinear portion and at least one rectilinear portion.

The mould chamber may alternatively be configured as a solid of revolution about one central symmetry axis only.

BRIEF DESCRIPTION OF THE DRAWINGS

The FIG. 1 is a front view of a mould according to this invention in the closure position;

The FIG. 2 is a sectional view of the FIG. 1 mould according to the line II—II of the FIG. 3;

Figure 1:
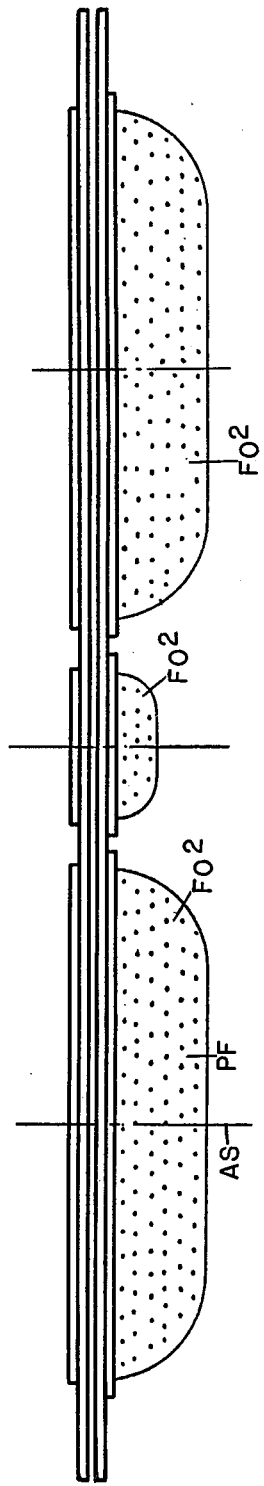
Figure 2:
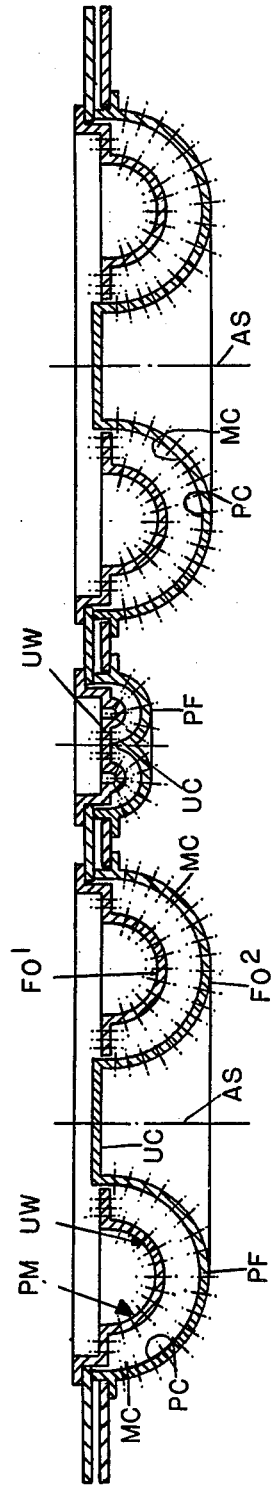
Figure 4:
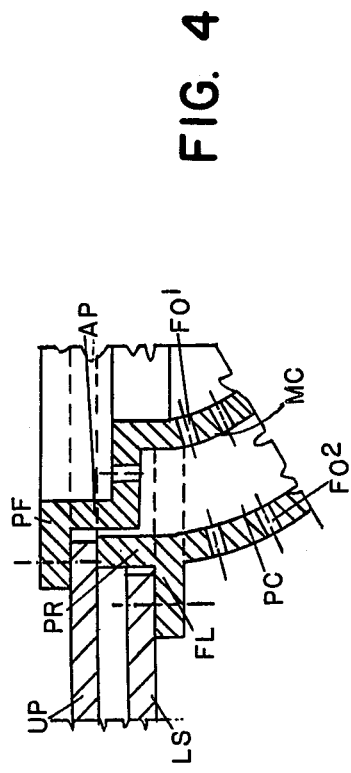
Figure 3:
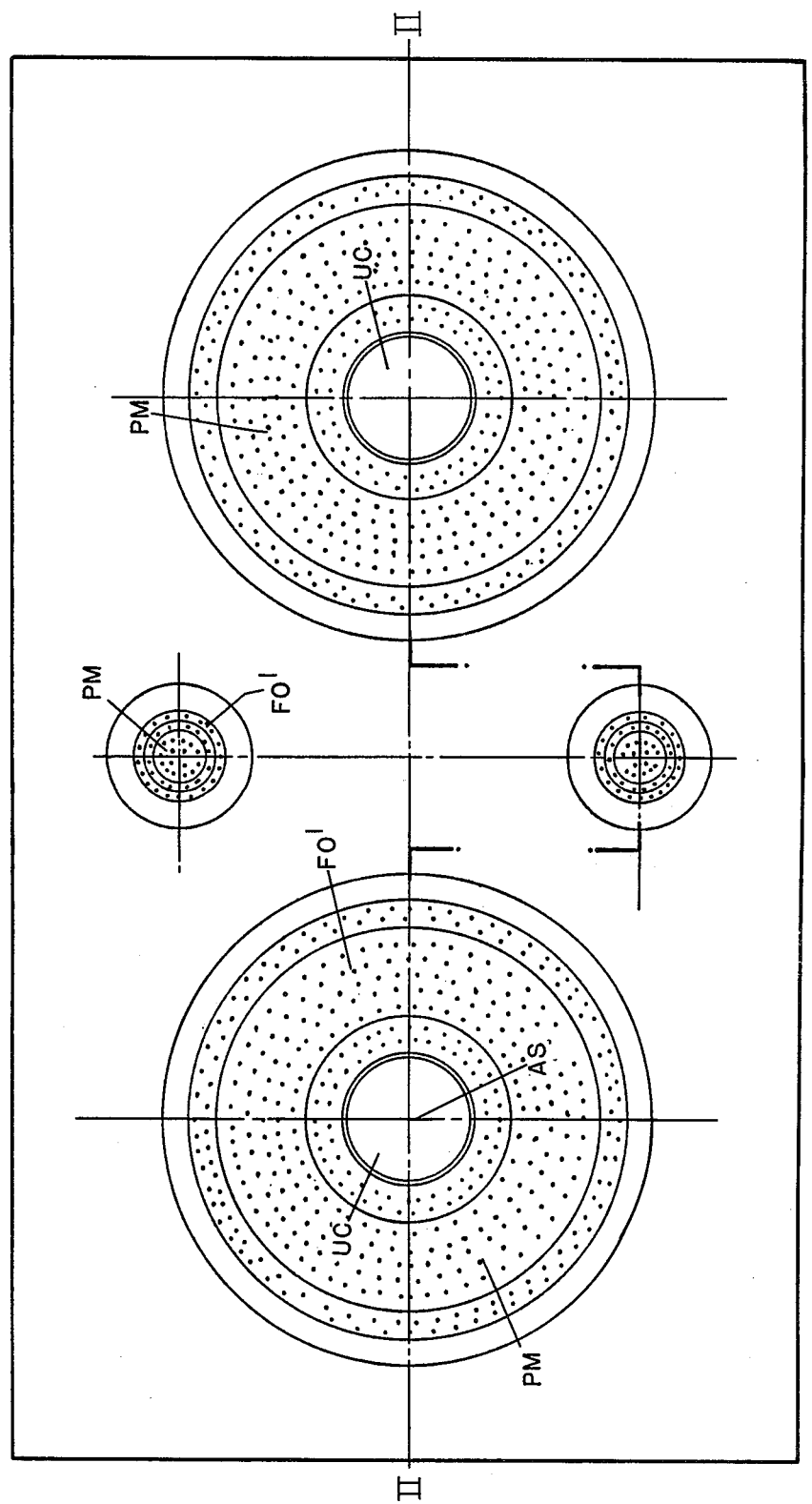

The FIG. 3 is a plan top view of the lower support plate carrying the female mould parts only;

The FIG. 4 is a detail of the FIG. 2 at an enlarged scale.

DESCRIPTION OF THE PREFERRED EMBODIMENT

With reference to said Figure a mould for use in manufacturing sem-elbows of thermally insulating material comprises a male part indicated generally as PM and a female part indicated generally as PF.

The female part PF is recessed to define an annular cavity PC configured as a body of revolution about a central axis AS leaving a centrally upstanding projection UC. The peripheral lip or rim of the cavity PC is shown at PR and below this there is provided an annular outwardly extending flange FL operable to seat and locate the female part PF in the lower support plate LS.

Each male part PM has a peripheral flange PF intended to be fixed to a upper plate UP; the flange extends downwards with an annular portion AP mating with cavity PC of the female mould. Portions PF and AP may be defined as an L-shaped portion of the male mould.

Each male mould has annular upstanding wall UW which extends further into the cavity PC, the annular wall UW and PC defining the configuration of the mould chamber when the male and female parts PM and PF are assembled.

These male and female mould parts are provided with uniformly distributed holes or apertures $FO^2$ and $FO^1$ respectively which open to the mould chamber for blowing overheated air into the mould chamber.

In order to make a thermally insulating semi-elbow for a pipe, a mixture of mineral fible, for example glass fibre or rock fibre, and a polymerisable resin is placed in the cavity PC and the male mould part PM is placed over the female mould part PF as visible in the FIG. 4 to define the mould cavity MC in which the mixture of mineral fible and polymerisable material is somewhat compacted. Overheated air is blown into the mould cavity through the apertures $FO^1$ and $FO^2$ to polymerise the resin and produce a shaped, bonded and moulded product which in this example is configured as a solid of revolution about the central axis AS.

A thermally insulating semi-elbow is then produced by severing the moulded product along angularly displaced planes extending radially of the central axis AS. The angular displacement of these severing planes may be selected to suit requirements but generally an angle of 90° is convenient. Two such semi-elbows are placed in face to face relationship to provide a complete annular elbow for insulating the elbow of a pipe.

With reference to the FIG. 4 it is remarked that female mould part annular projection PR abuts against the upper plate UP supporting the male mould parts.

By this way a perfect adjustment may be obtained by lathing this annular projection. For the same ground the male mould parts are shaped with the L-profiled flange fixed to and abutting against the outside surface of the upper support plate UP.

The lower support plate LS and the upper support plate UP are hinged around an horizontal spindle and the flanges of the male parts and female parts may be operate to center the mould parts in the support plates.

The cavity defined by the male part and female part may be alternatively symmetrical about two mutually perpendicular axes. The advantage of this embodiment of the invention is that the angular displacement of the severing planes can be selected to include not only four curvilinear or radiused portion for the pipe elbow but also four rectilinear portions to extend along the rectilinear run of the pipe to facilitate abutment of insulating sleeving for the pipe. The severing planes may be selected to include a rectilinear portion at each end of the curvilinear or radiused portion of the semi-elbow which radiused portion extends about the elbow of the pipe.

What I claim is:

1. Mould for the manufacture of a thermally insulating semi-elbow for pipes, the semi-elbow being formed from mineral fibres bonded by a polymerisable resin characterized in that it consists of an upper support plate carrying the male mould parts and a lower support plate carrying the female mould parts, the upper and lower plate being hinged to one another, the female mould parts presenting a peripheral flanged portion and an annular abutment portion extending upwardly from said peripheral flanged portion, the male mould parts presenting an L-profiled flanged portion mating with said annular abutment portion and fixed to the outside surface of the upper plate, the latter abutting against said annular abutment portion of the female mould parts, said peripheral flange of the female mould portion and the L-profiled flange of the male mould portion being operable to center, respectively, the male portion in the upper support plate and the female portion in the lower support plate, the male and female mould parts defining therebetween a mould annular chamber extending for 360° about a central axis so as to define a semi-elbow, the mould parts being provided with holes or apertures for blowing overheated air into the mould chamber to produce a moulded shaped product from the mixture of mineral fibres and a polymerisable resin when placed in the mould chamber.

2. A mould according to claim 1 characterized in that the mould chamber is annular and shaped as a solid of revolution about the central axis.

3. A mould according to claim 1 characterized in that the mould chamber has at least two axes of symmetry and has four rectilinear portions joined by four curvilinear or radiused portions.

* * * * *